(12) United States Patent
Shima

(10) Patent No.: US 7,085,584 B2
(45) Date of Patent: Aug. 1, 2006

(54) PORTABLE TELEPHONE SET

(75) Inventor: Makoto Shima, Shizuoka (JP)

(73) Assignee: NEC Corporation, Tokyo (JP)

(*) Notice: Subject to any disclaimer, the term of this patent is extended or adjusted under 35 U.S.C. 154(b) by 784 days.

(21) Appl. No.: 10/176,829

(22) Filed: Jun. 20, 2002

(65) Prior Publication Data
US 2002/0198030 A1   Dec. 26, 2002

(30) Foreign Application Priority Data
Jun. 21, 2001   (JP)   ............... 2001-187638

(51) Int. Cl.
H04M 1/00   (2006.01)

(52) U.S. Cl. ............... 455/550.1; 455/90.1; 455/575.1; 345/164

(58) Field of Classification Search ............. 455/550.1, 455/575.1, 90.1, 566, 550.2, 550.3, 575.6, 455/90.2, 90.3; 345/163, 164; 379/433.1, 379/433.11, 433.13
See application file for complete search history.

(56) References Cited

U.S. PATENT DOCUMENTS

| | | | |
|---|---|---|---|
| 5,428,406 A * | 6/1995 | Terasawa | 345/163 |
| 6,349,220 B1 * | 2/2002 | Prior et al. | 455/90.1 |
| 6,415,165 B1 * | 7/2002 | Ishigami | 455/566 |
| 6,487,424 B1 * | 11/2002 | Kraft et al. | 455/550.1 |
| 6,492,975 B1 * | 12/2002 | Weiss | 345/163 |
| 6,618,037 B1 * | 9/2003 | Sakamaki et al. | 345/163 |
| 6,965,783 B1 * | 11/2005 | Pirkola et al. | 455/575.1 |

FOREIGN PATENT DOCUMENTS

| | | | |
|---|---|---|---|
| CN | 1097908 A | | 1/1995 |
| CN | 1287634 A | | 3/2001 |
| JP | 07210315 | * | 11/1995 |
| JP | 8-79353 | | 3/1996 |
| JP | 08-079353 | * | 3/1996 |
| JP | 8-307495 | | 11/1996 |
| JP | 08-307495 | * | 11/1996 |
| JP | 11-32113 | | 2/1999 |
| JP | 2000-270072 | | 9/2000 |
| JP | 2001-16635 | | 1/2001 |
| JP | 2001-016635 | * | 1/2001 |
| JP | 2001-92582 | | 4/2001 |
| JP | 2001-092582 | * | 4/2001 |
| JP | 2001-100909 | | 4/2001 |
| JP | 2001-117553 | * | 4/2001 |
| WO | WO 98/49815 | | 11/1998 |

* cited by examiner

Primary Examiner—Lana Le
(74) Attorney, Agent, or Firm—Scully, Scott, Murphy & Presser, P.C.

(57) ABSTRACT

A portable telephone set equipped with a telephone function equivalent to that of a mobile phone includes a display section, on which one or more selection items in addition to various displays are displayed, and key switches for an input operation. Its main body is provided with a mouse type input section capable of selecting the selection items displayed on the display section. The mouse type input section has the structure similar to that of a track ball type mouse or an optical mouse for a personal computer, and is disposed at the bottom, back or side surface of the main body integrally with the main body.

12 Claims, 15 Drawing Sheets

PORTABLE TELEPHONE SET

FIELD OF THE INVENTION

The present invention relates to a portable telephone set and, more particularly, to a portable telephone set provided with a mouse type input section, which has an operability equivalent to that of a mouse for use in a personal computer or the like and can be manipulated on the telephone set body.

BACKGROUND OF THE INVENTION

A portable telephone set such as a mobile phone or a personal handyphone system (abbreviated as "PHS") has been reduced in size and weight enough to be put in a pocket owing to the progresses of the semiconductor technology, the electronic circuit technology, the casing machining technology and the like. Therefore, it has remarkably become so widespread that the number of subscribers exceeds that of stationary telephones. A person, who always possesses a portable telephone set, also can utilize various functions in addition to its original telephone functions since a CPU is used for a control operation. Specifically, the portable telephone set has a function of electronic telephone book or address book, a calendar function, a clock function, a recording function (a sound memo function), a mail function, a browser function and the like. Thereafter, it can provide even a user having little opportunity of utilizing a telephone with various utilizing methods, thereby enhancing the availability. As the number of functions increases, the functional difference between the portable telephone set and a personal digital assistant (abbreviated as "PDA") has become smaller. Thus, the portable telephone set can also function as a portable, small-sized and simple personal computer.

Input keys for the above-described portable telephone set generally consist of numeral/character input keys, scroll keys for the purpose of item selection, arrow keys and four-direction keys. However, since the use frequency of the portable telephone set has become higher as the functions of an electronic mail, a browser and the like have been enhanced in recent years, there has been a demand for the configuration of an easy key input operation in addition to a small size.

A portable telephone set capable of satisfying the above-described demand is disclosed in, for example, Japanese Patent Application Laid-Open No. 270072/2000, in which there are only two key buttons, i.e., an up-down and right-left button (a cross button) and a selection button, there are numeral rows (1, 2, 3 . . . ) and character rows (a, ka, sa, ta, na . . . or A, B, C . . . ) on a display, and then, characters and numerals can be input by selecting one of the numerals and characters displayed and designating conversion/non-conversion, a small letter/a capital letter, hirakana/katakana or the like. Consequently, operability can be secured while achieving miniaturization.

Otherwise. Japanese Patent Application Laid-open No. 32113/1999 discloses that a track ball and three keys, i.e., a communication key, a termination key and a cancel key, are disposed in place of conventional ten keys, wherein selection of a numeral or an item, retrieval of an abbreviated dial number and the like can be performed by operating the track ball like a cross key.

However, in the case of the conventional portable telephone set disclosed in Japanese Patent Application Laid-Open No. 270072/2000, a cursor for selecting an item to be displayed on a display screen can be moved only in horizontal and vertical directions, but cannot be moved in slantwise directions Therefore, if the cursor is intended to be moved from coordinates (x, y) to other coordinates (x+3, y+2), the up-down and right-left button need to be moved three times in the lateral direction and twice in the vertical direction. That is to say, five key operations need be performed in total. In this way, although an improvement in operability is directed, in fact, the operation of a frequent finger motion is required, and thus, this key input system is inconvenient for a user.

Also in the case of the conventional portable telephone set disclosed in Japanese Patent Application Laid-Open No. 32113/1999, since there is no numeral key, it is difficult to input a telephone number or the like, and further, since the setting position of the track ball is restricted to a conventional numeral key position, operation like a mouse cannot be performed while a main body is kept to be gripped. What is worse, the display or item selection with respect to information obtained via the track ball is restricted only in the vertical and lateral directions, and the track ball cannot be moved (or selected) in slantwise directions.

In recent years, a notebook-sized personal computer or a handheld personal computer has remarkably become widespread, and the Internet can be readily utilized as soon as a user buys it or if he or she only adds a simple adapter. Therefore, if the user brings the notebook-sized personal computer or the handheld personal computer (hereinafter referred to as "a portable type personal computer") together with a portable telephone set on a private trip or on a business trip, he or she can perform communications without any connection to a public telephone network via a cable.

The portable type personal computer gives first priority to the portability, and therefore, a small size and a light weight are achieved to the limit. Consequently, a mouse incorporated in a personal computer body (or disposed near a keyboard unit) is poor in operability in comparison with a mouse of an external connection type via a cable. So, many users bring the mouse of an external connection type having good operability. However, unless the personal computer is used, the mouse of an external connection type becomes an obstacle, thereby inducing inconvenience in portability.

SUMMARY OF THE INVENTION

The present invention has been accomplished in an attempt to solve the above problems observed in the prior art. An object of the present invention is to provide a portable telephone set provided with a mouse type input section integrated with a telephone set body, in which it is unnecessary to independently bring the input section while operability equivalent to that of a mouse in a personal computer can be achieved.

In order to achieve the above-described object, according to the present invention, there is a portable telephone set provided with a radio telephone function and including a main body provided with a display section, on which one or more selection items in addition to various displays are displayed, and key switches for an input operation, the portable telephone set comprising: a mouse type input section, which is disposed in the main body and can select the selection items displayed on the display section; and a control section for detecting coordinates based on an output signal from the input section so as to control to move a display screen in the display section or specific information on one and the same plane in all directions on the basis of the detection result.

With this arrangement, the mouse type input section is disposed in the main body of the portable telephone set such that a selection item displayed on the display section can be selected via the input section, and further, display control and movement control in any direction inclusive of slantwise directions relevant to the operation of the input section are performed by the control section. Consequently, an image displayed on the display section can be scrolled or a cursor for selecting a character in a character input mode can be moved in accordance with the operation of the input section. Furthermore, since the input section is of a mouse type, a cursor or a pointer can be moved in the slantwise directions, unlike conventional cross keys or arrow keys, thereby directly drawing a picture or inputting a character. Moreover, it is possible to achieve operability equivalent to that of a mouse in a personal computer, and eliminate inconvenience, which has been experienced in the prior art, that a user must bring an input device such as a mouse.

DETAILED DESCRIPTION OF THE PREFERRED EMBODIMENTS

Preferred embodiments according to the present invention will be described below in reference to the accompanying drawings.

Figure 1:
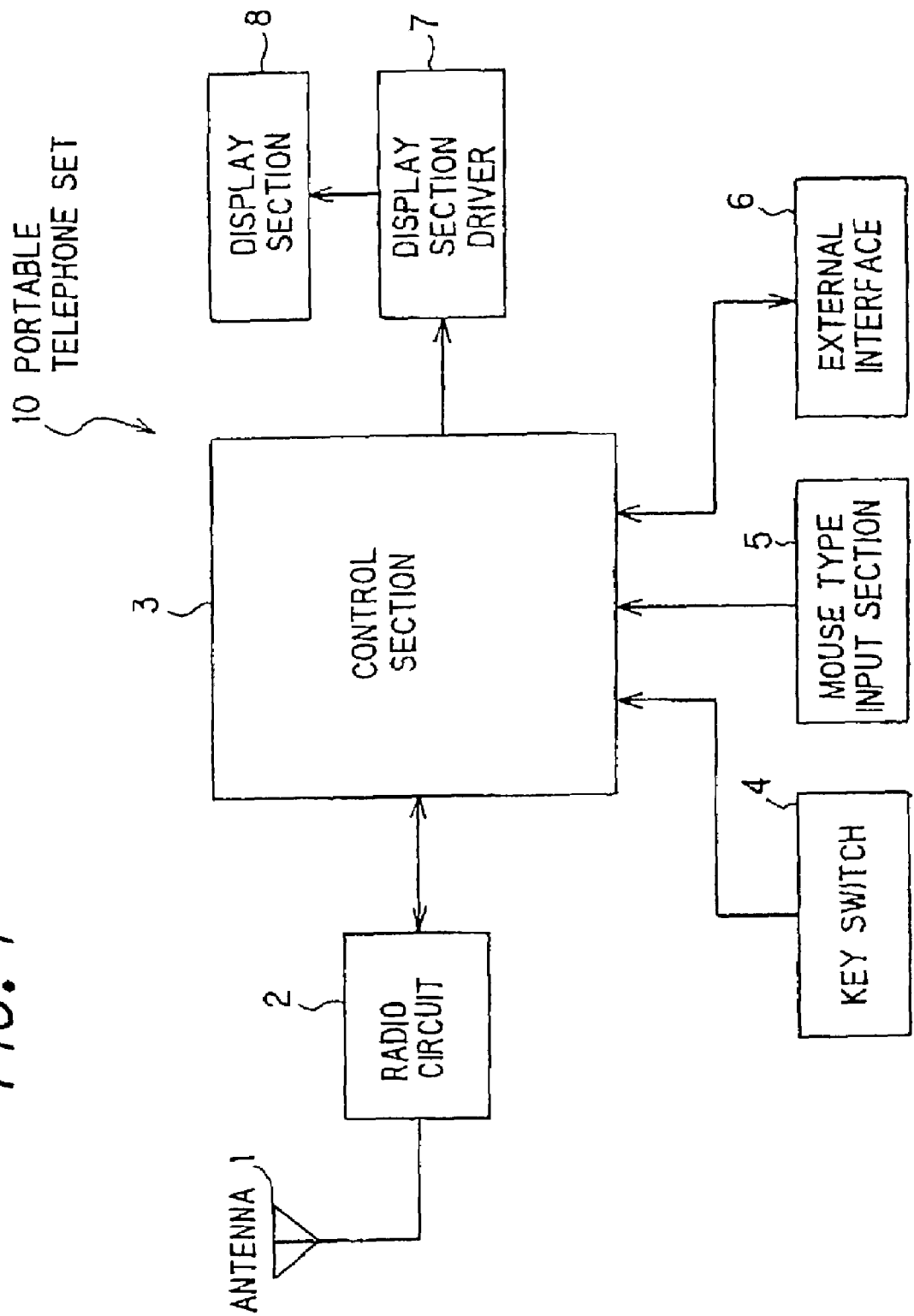
FIG. 1 is a block diagram illustrating a portable telephone set according to the present invention.

FIG. 1 illustrates a portable telephone set according to the present invention.

A portable telephone set 10 comprises: an antenna 1; a radio circuit 2 connected to the antenna 1; a control section 3 for controlling the entire portable telephone set 10; key switches 4 disposed at the front surface of a main body; an mouse type input section 5 having a function equivalent to that of a mouse for use in a personal computer; an external interface 6 connected to external equipment (e.g., a personal computer, a printer or the like); a display section driver 7 connected to the control section 3, for performing display control; and a display section 8 constituted of a liquid crystal display unit or the like and connected to the display section driver 7.

The radio circuit 2 is equipped with the functions of transmission and reception, and thus, is connected to a base station in a telephone mode via the antenna 1 by a radio, so that communications can be performed. The control section 3 has control over the radio circuit 2, the key switches 4, the mouse type input section 5, the display section driver 7 and the display section B. The key switches 4 consist of a key for turning on or off a power source of the portable telephone set, numeral keys, character keys and other functional keys. On the display section 8 are displayed the telephone number of the other end of the phone, an electronic telephone book, mail contents or the like in the telephone mode while a calendar, a clock, a memo pad or the like during non-communications, and further, a selection/execution button for a selection item in association with the operation of the mouse type input section 5. The selection/execution button is used also in the operation of the mouse type input section 5, that is, is used for selecting or executing a selection item displayed on a display screen. Although the selection/execution button is displayed here on the display section 8, this function may be assigned to any one of the keys disposed in the main body.

The mouse type input section 5 is disposed independently of the key switches 4, and is an input mechanism for scrolling the display screen or moving a cursor or a mouse pointer on the display screen. The mouse type input section 5 may be configured in the general form of a track ball type mouse, an optical mouse or the like.

Here, the character input function and the numeral input function fulfilled by the key switches 4 may be performed by the mouse type input section 5, or by both of the key switches 4 and the mouse type input section 5: namely, the design can be freely set in accordance with the need. In addition, the mouse type input section 5 may be configured by including the selection/execution button. Additionally, the character keys and the numeral keys may be configured to be controlled via software. The external interface 6 is used in transmitting a predetermined transmission signal (such as data) to external equipment such as a personal computer via a cable or a radio.

Figure 2:
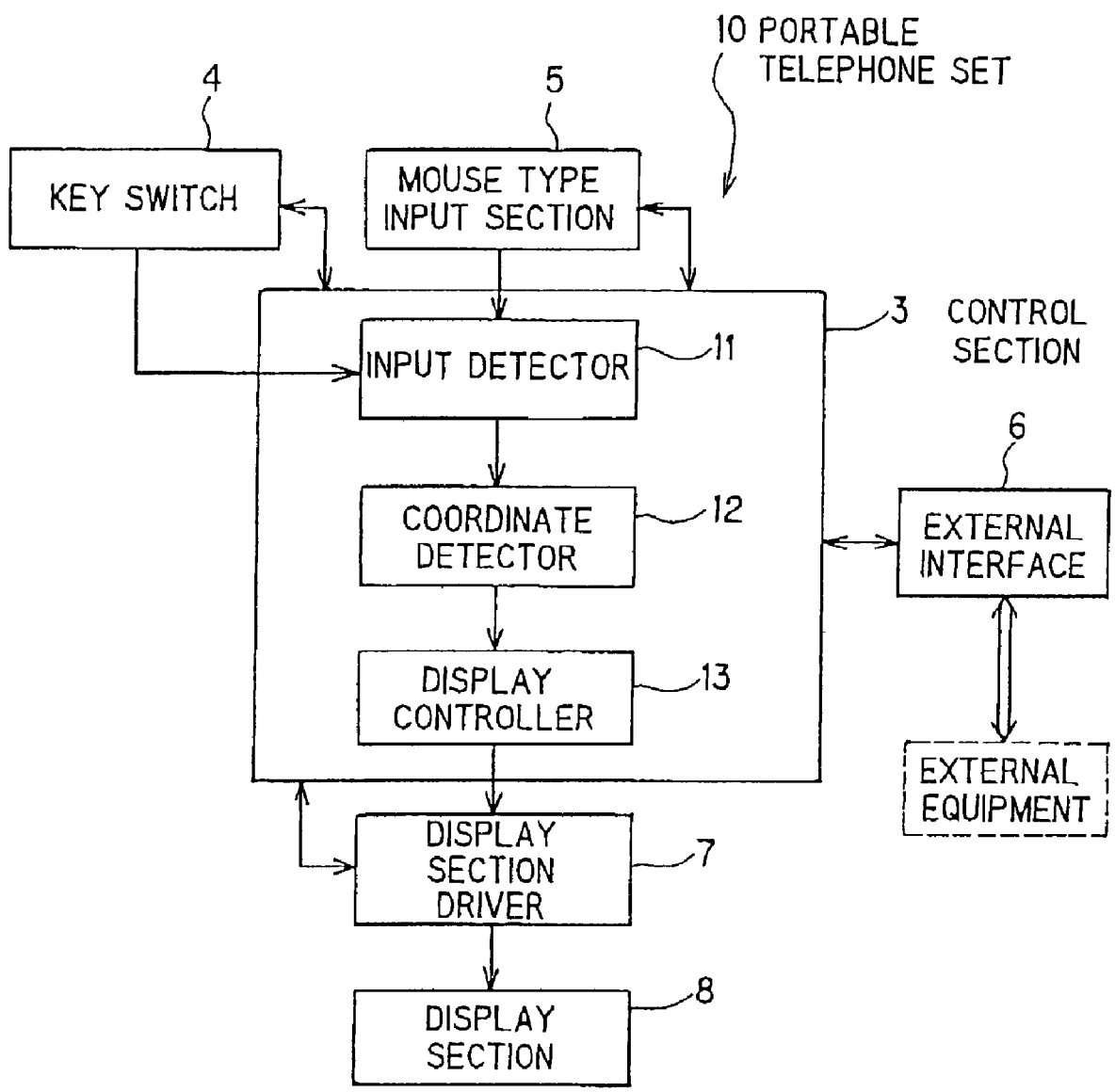
FIG. 2 is a block diagram illustrating the detailed arrangement of a control section illustrated in FIG. 1.

FIG. 2 illustrates the detailed arrangement of the control section 3 illustrated in FIG. 1. The control section 3 comprises: an input detector 11 for detecting the operation of the key switches 4 or the mouse type input section 5; a coordinate detector 12 for detecting coordinates on the basis of the detection result of the input detector 11; and a display controller 13 for performing predetermined displaying on the basis of the result of the coordinate detector 12.

The input detector 11 is adapted to detect the moving direction (i.e., x and y directions), a moving quantity and a moving speed of a cursor in accordance with the operating state of the mouse type input section 5 in response to an output signal from the mouse type input section 5 illustrated in FIG. 1. The coordinate detector 12 detects information from the input detector 11 as coordinate information. The display controller 13 controls to scroll the display screen or move the cursor or the mouse pointer on the display screen in accordance with the coordinate information. Here, the input detector 11 may be configured in such a manner as to simultaneously output input information from the selection/execution button set by any one of the key switches 4 to the coordinate detector 12 in addition to the information (i.e., the moving direction, the moving quantity and the moving speed) from the mouse type input section 5.

Figure 3:
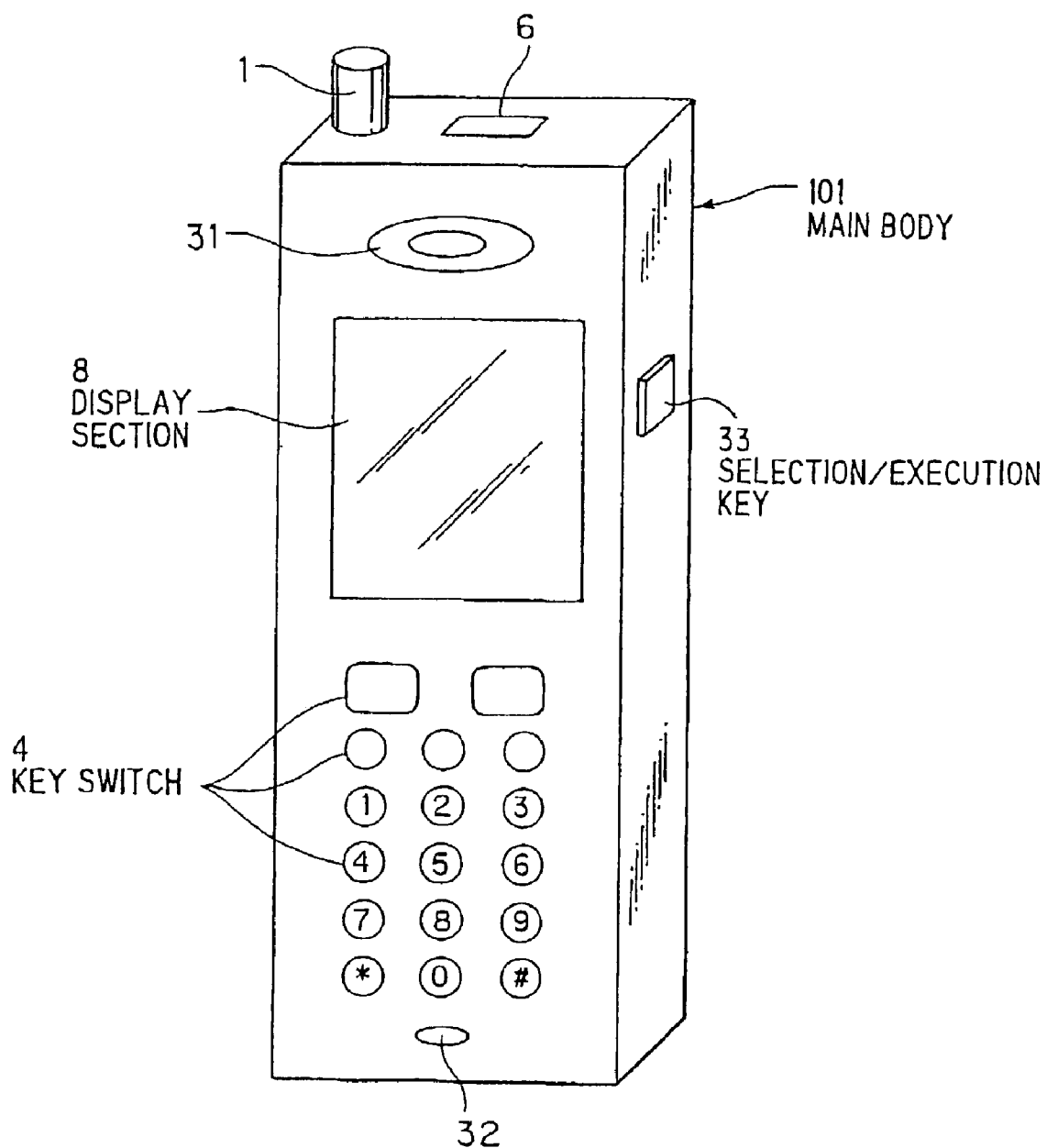
FIG. 3 is a perspective view showing a first example of the front appearance of the portable telephone set according to the present invention.
Figure 4:
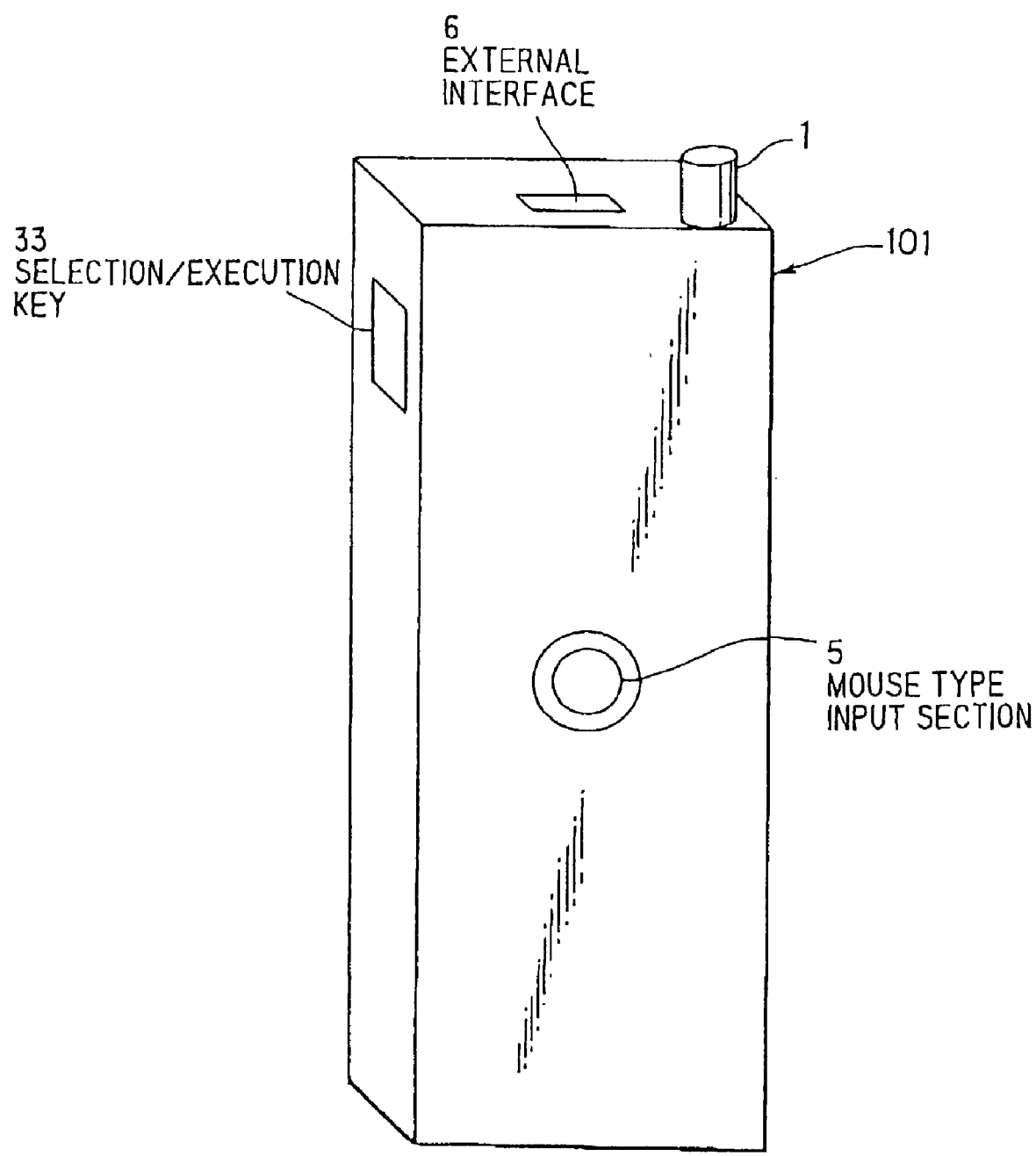
FIG. 4 is a perspective view showing the rear side of the portable telephone set of FIG. 3.

FIGS. 3 and 4 show a first example of the appearance of the portable telephone set according to the present invention, in which a track ball is used as the mouse type input section 5. FIG. 3 is a perspective view showing the front surface (i.e., the front side), and FIG. 4 is a perspective view showing the back surface (i.e., the rear side).

At the front surface of a main body 101, there are provided the key switches 4, the display section 8, a receiver (i.e., a speaker) 31 and a transmitter (i.e., a microphone) 32 at predetermined positions, respectively. Moreover, at the top surface of the main body 101 are disposed the antenna 1 and the external interface 6, and further, at the side surface is attached a selection/execution key 33. Additionally, at the center on the rear side is disposed the mouse type input section 5, wherein a track ball is adopted.

It is preferable that the mouse type input section 5 should be disposed at a surface reverse to the surface at which the display screen is disposed, in the main body 101. Consequently, in using the mouse type input section 5, the main body 101 is horizontally slid on the plane of a desk while the main body 101 is gripped by hand, so that a mouse operation can be performed while seeing the display. In addition, if a button functioning as an item selection/execution key for the mouse type input section 5 is disposed at the front side (i.e., the display surface) of the main body 101, a click operation can be performed by an index finger or middle finger, like a mouse in a personal computer, thereby enhancing operability. As shown in FIG. 3, if the selection/execution key 33 is attached to the side surface of the main body 101, a click operation can be performed by a thumb. Otherwise, if the selection/execution key 33 is assigned to any one of the key switches 4 or software switches the use of the selection/execution key 33 (or another key attached to the side surface), the portable telephone set can be customized to suit the preferences of the user.

Figure 5:
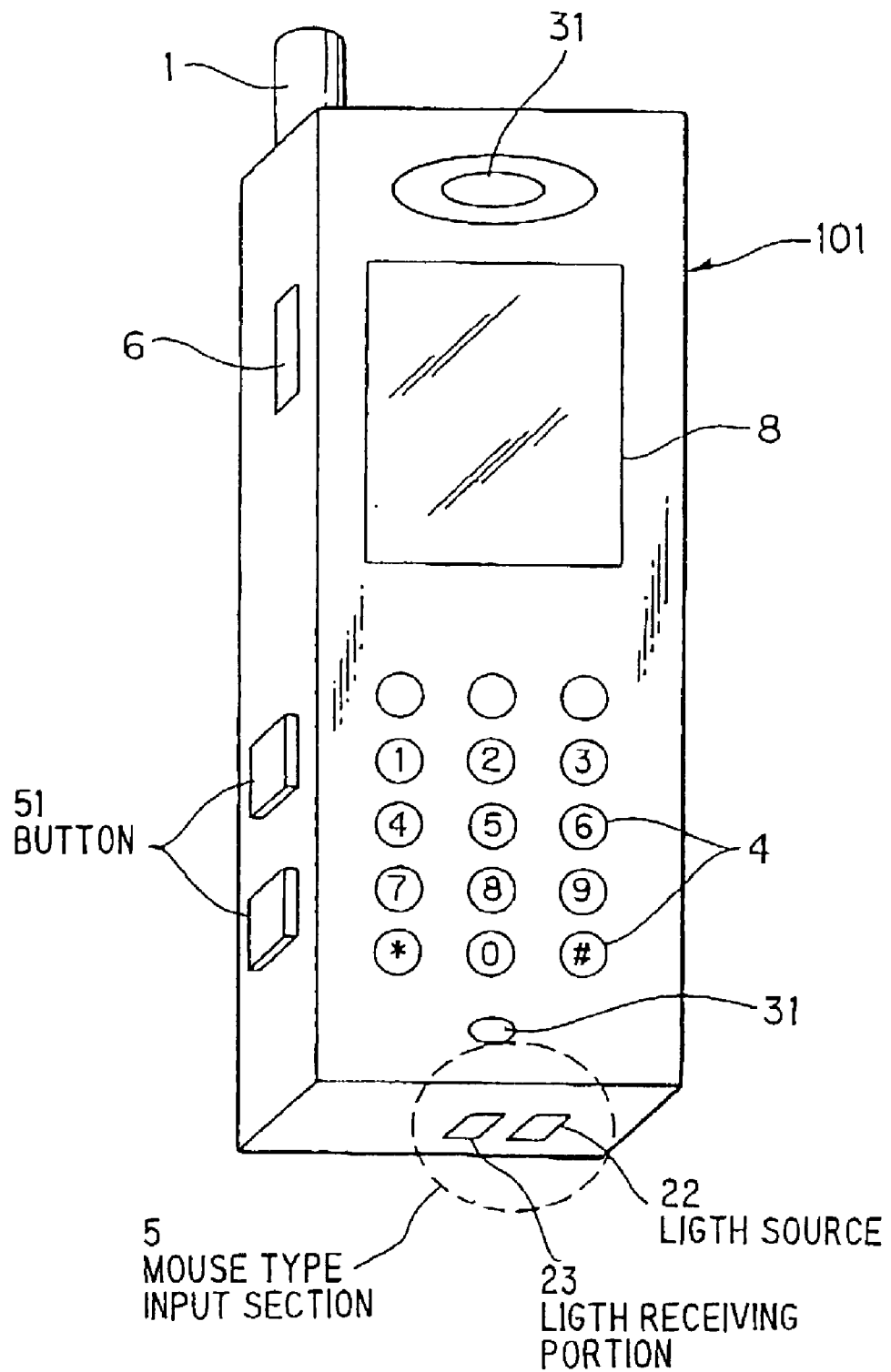
FIG. 5 is a perspective view showing a second example of the front appearance of the portable telephone set according to the present invention.
Figure 6:
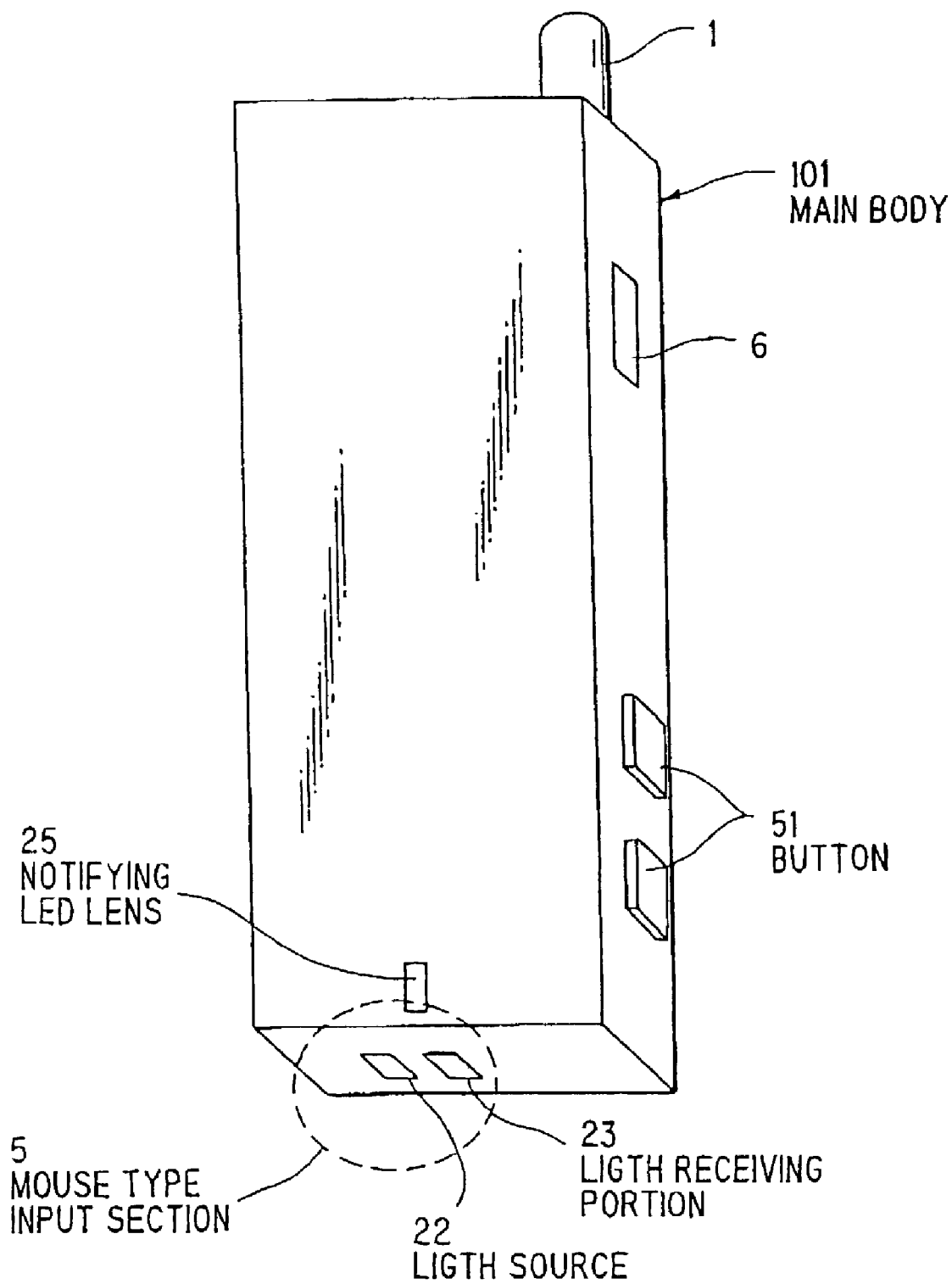
FIG. 6 is a perspective view showing the rear side of the portable telephone set of FIG. 5.

FIGS. 5 and 6 show a second example of the appearance of the portable telephone set according to the present invention, in which an optical mouse is used as the mouse type input section 5. FIG. 5 is a perspective view showing the front surface (i.e., the front side), and FIG. 6 is a perspective view showing the back surface (i.e., the rear side).

As shown in FIGS. 5 and 6, the mouse type input section 5 is disposed at the bottom surface (i.e., the lower surface) of the main body 101. Furthermore, buttons 51 are arranged at the side surface of the main body 101 in the proximity of the mouse type input section 5. Although the buttons 51 are arranged here at the side surface, they may be arranged at the front surface (i.e., the surface at which the key switches 4 and the display section 8 are fixed). The mouse type input section 5 consists of a light source 22 for irradiating a mouse pad or the top surface of a desk with light, and a light receiving portion 23 for receiving the light emitted from the light source 22 and reflected on the mouse pad or the top surface of the desk, followed by optoelectronic transducing. The light source 22 is formed of an LED (a light emitting diode) having the feature of low power consumption. In the vicinity of the mouse type input section 5 is disposed a notifying LED lens 25, which is responsible for introducing, outside of the main body 101, light emitted from a notifying LED, not shown, for notifying a reception to the portable telephone set 10 or a time alarm to a user.

The buttons 51 are used for selecting/executing a selection item on the screen of the display section 8 by operating the mouse type input section 5. The mouse type input section 5 and the buttons 51 are arranged in this manner, so that the main body 101 can be gripped as if a pen was used in inputting via the mouse, and then, the buttons 51 can be depressed while the main body 101 is kept to be gripped, thereby providing the structure excellent in usability. Moreover, since the mouse type input section 5 is disposed at the bottom surface of the main body 101, the main body 101 can be used in much the same way a user has a pen. Consequently, when the portable telephone set 10 is moved horizontally on the desk, the mouse operation can be performed while seeing the display screen on the display section 8. That is to say, the selection/execution buttons 51 are arranged at positions at which an index finger or a thumb touches when the user has the main body 101 as if he or she had a pen, thus further improving the usability.

Figure 7:
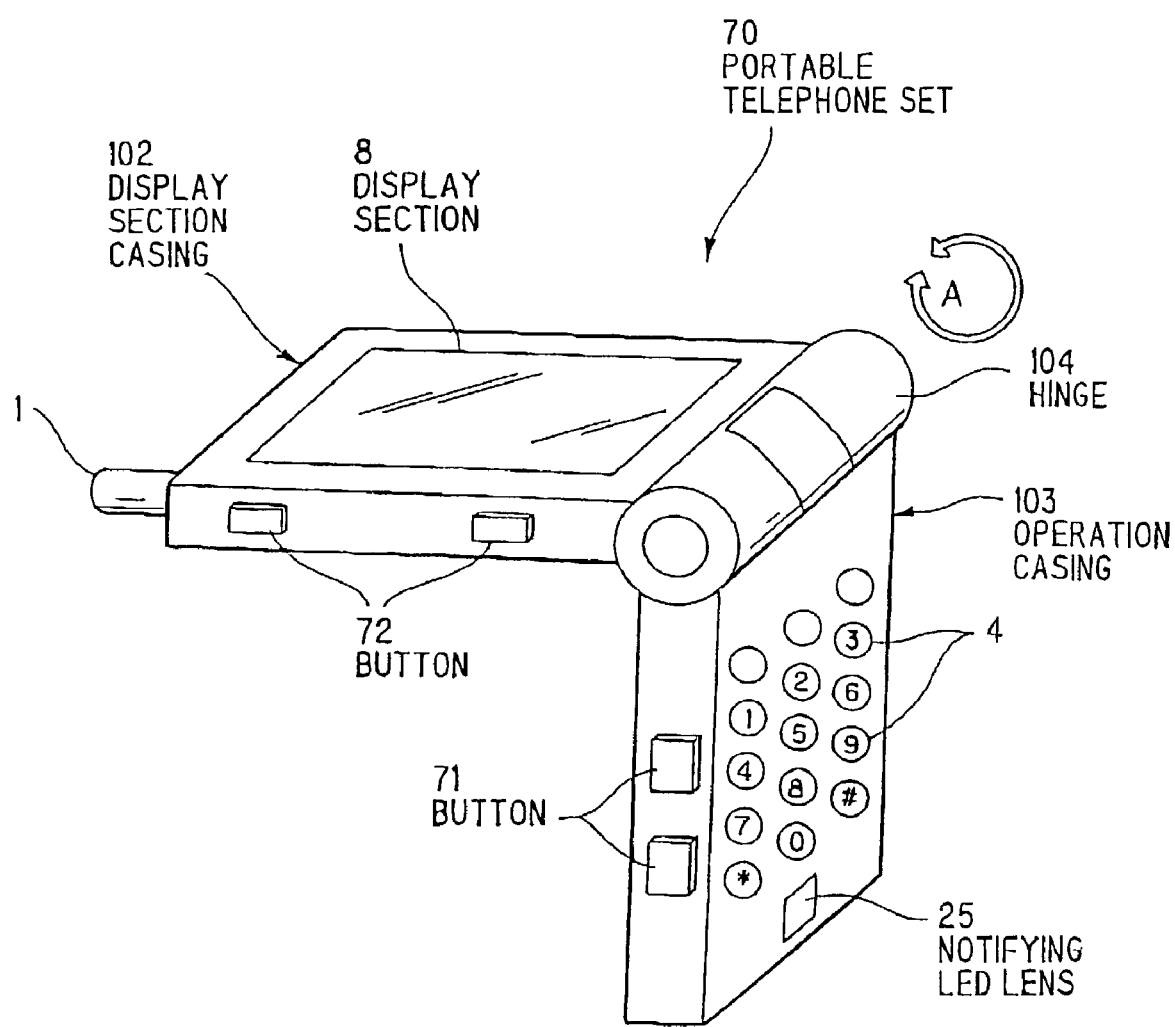
FIG. 7 is a perspective view showing a third example of the front appearance of the portable telephone set according to the present invention.
Figure 8:
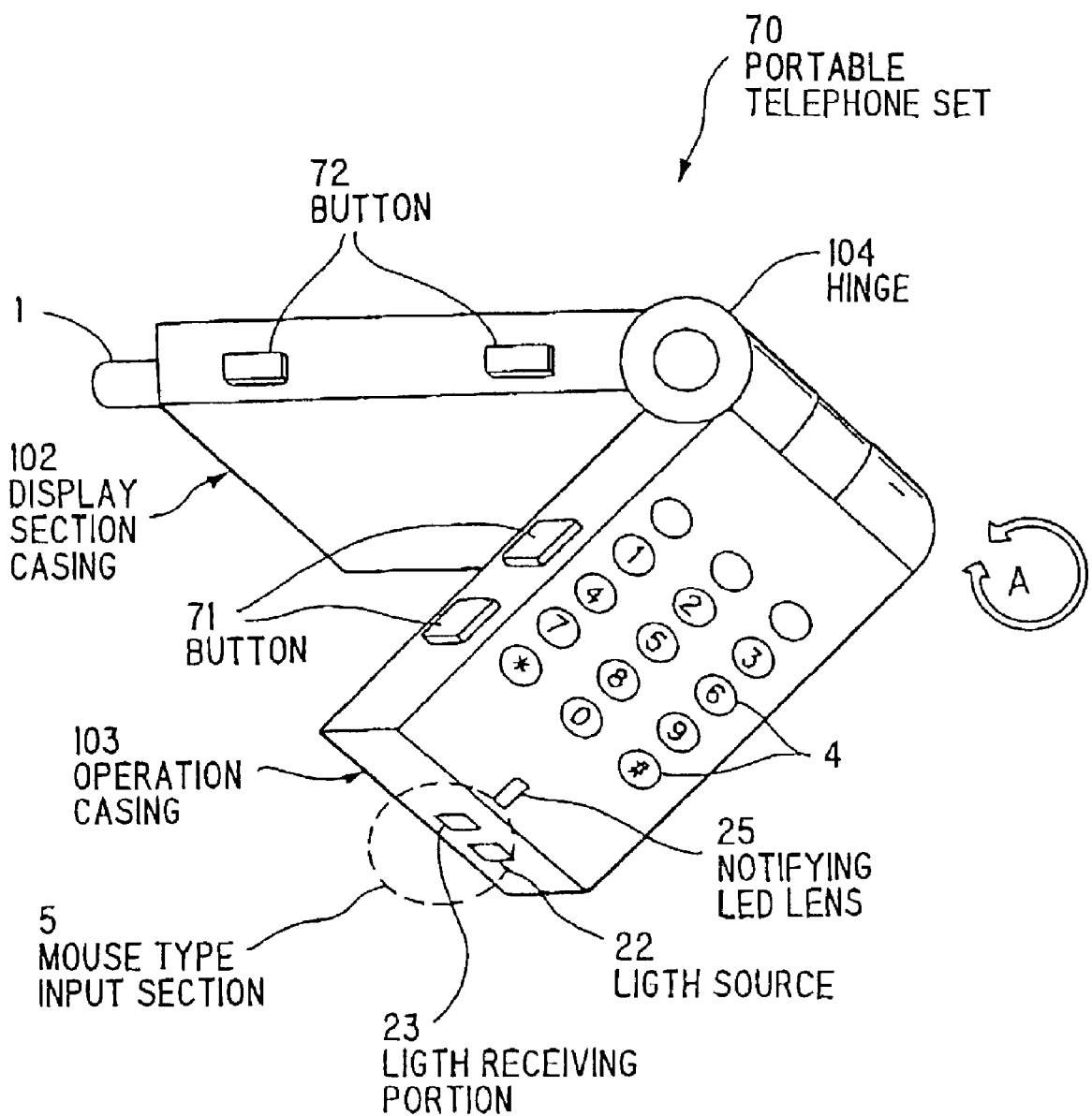
FIG. 8 is a perspective view showing the rear side of the portable telephone set of FIG. 7.

FIG. 7 and FIG. 8 show a third example of the appearance of the portable telephone set according to the present invention, in which an optical mouse is used as the mouse type input section 5. FIG. 7 is a perspective view showing the front surface (i.e., the front side), and FIG. 8 is a perspective view showing the back surface (i.e., the rear side).

As shown in FIGS. 7 and 8, a portable telephone set 70 has a folio structure (i.e., a folding structure), in which a main body consists of a display section casing 102 and an operation casing 103, Both of the casings 102 and 103 are screwed in a freely open or closed manner via a hinge 104: namely, they can be opened or closed in a direction indicated by a double-headed arrow A in FIGS. 7 and 8 within a range of about 360° from a folded state at 0° to a horizontal state at about 180°, and further, to a state at 0° in a reverse direction.

As shown in FIG. 7 and FIG. 8, key switches 4 and a notifying LED lens 25 are disposed at the front surface (i.e., an operating surface) of the operation casing 103, and further, a mouse type input section 5 provided with a light source 22 and a light receiving portion 23 is disposed at the end surface. Moreover, buttons 71 for selecting/executing a selection item on a screen of a display section 8 are attached at the side surface of the operation casing 103. Additionally, buttons 72 having the same functions as those of the buttons 71 are attached at the side surface of the display section casing 102.

With the configuration shown in FIGS. 7 and 8, the angle defined between the display section casing 102 and the operation casing 103 is appropriately set with the display section 8 facing upward, as shown in FIG. 7. The mouse type input section 5 is horizontally slid over a desk plane on a desk or the like while keeping the attitude shown in FIG. 7, so that a user can operate a mouse while seeing the display screen on the display section 8 from the above. Consequently, an input operation becomes remarkably facilitated.

Figure 9:
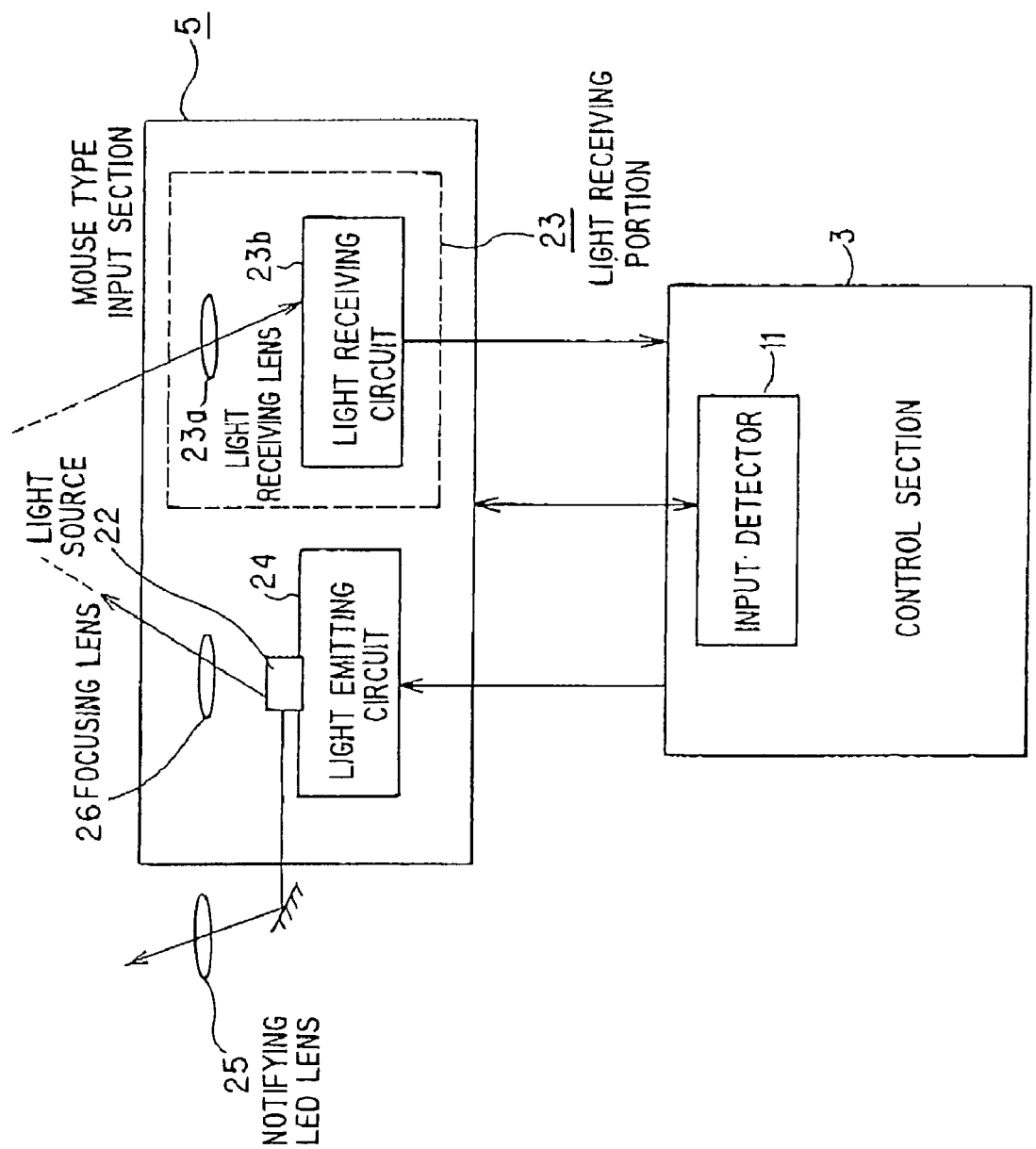
FIG. 9 is a block diagram illustrating the schematic arrangement of an optical mouse type input section illustrated in FIG. 5 to FIG. 8.

FIG. 9 illustrates the arrangement of the optical mouse type input section 5 shown in FIGS. 5 to 8 and the connection of the optical mouse type input section 5 to the control section 3.

The mouse type input section 5 is provided with the light source 22 formed of an LED, a light receiving lens 23a and a light receiving circuit 23b constituting the light receiving portion 23, a light emitting circuit 24 for driving the light source 22, and a focusing lens 26 disposed on a light emission optical path of the light source 22. The light emitting circuit 24 is controlled by the control section 3, and thus, functions as a circuit configuring a mouse function during the use of the mouse, and further, as a circuit for driving a notifying alert LED in the case where there is a notice to a user.

The light receiving circuit 23b is provided with a photo diode (abbreviated as "PD"), not illustrated, as a light receiving element, for optoelectronically transducing the light from the light receiving lens 23a, so as to output the resultant electric signal to the input detector 11. The light emitting circuit 24 is responsible for allowing the LED serving as the light source 22 to emit the light, and further, for actuating it as a notifying LED when the light source 22 is not used as a light source. In using the light source 22 as the notifying LED, a reflecting member should be preferably disposed at a required position, as necessary, in the case where the light cannot be sufficiently guided to a notifying LED lens 25. The light source 22 consists of two light sources (i.e., LEDs) having different wavelengths. Each of the light receiving lens 23a and the light receiving circuit 23b is constituted in pair. Consequently, the lights emitted from the two light sources 22 reach the top surface of the desk through independent routes, respectively, and the two light sources and the two light receiving elements are positioned in such a manner that the reflected lights enter into the corresponding light receiving elements independently of each other. A detection signal output from the light receiving element (i.e., the photo diode) is input into the input detector 11.

With the arrangement illustrated in FIG. 9, the switch function for the screen operation, which has been required in the conventional potable telephone set, is embodied by the mouse type input section 5, and further, the LED of the light emitting circuit 24 is used also as the notifying LED, so that a packaging space can be effectively utilized while exhibiting the function equivalent to that of the conventional potable telephone set (a mobile phone, a PHS or the like). Additionally, since input means for the screen operation adopts the mouse type input section 5, the operability of the screen can be remarkably enhanced. Incidentally, the notifying LED and the switch for the screen operation need be separately mounted in the conventional potable telephone set.

Figure 10B:
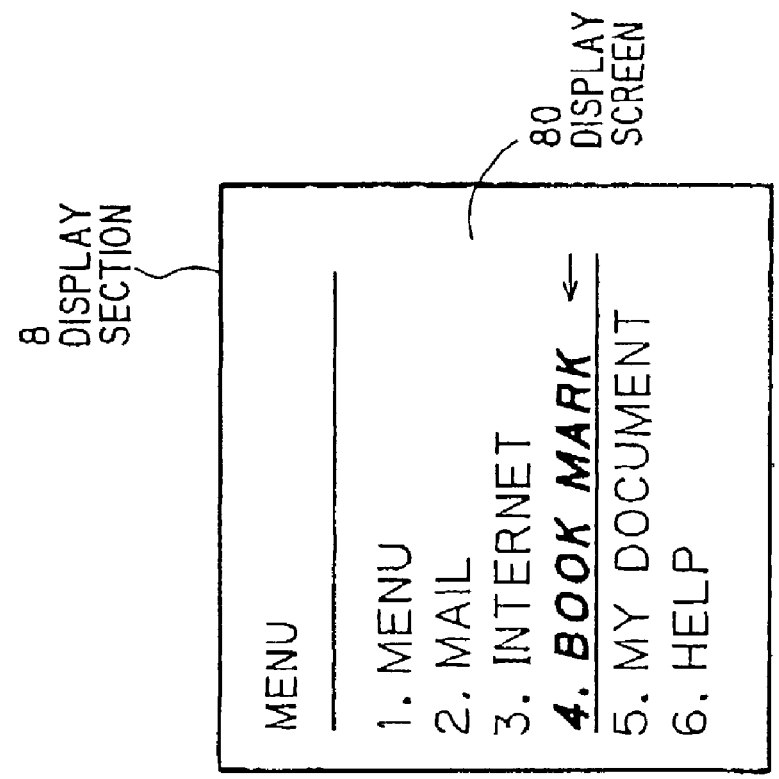
FIGS. 10A and 10B illustrate examples of screens on a display section in the portable telephone set according to the present invention.
Figure 10A:
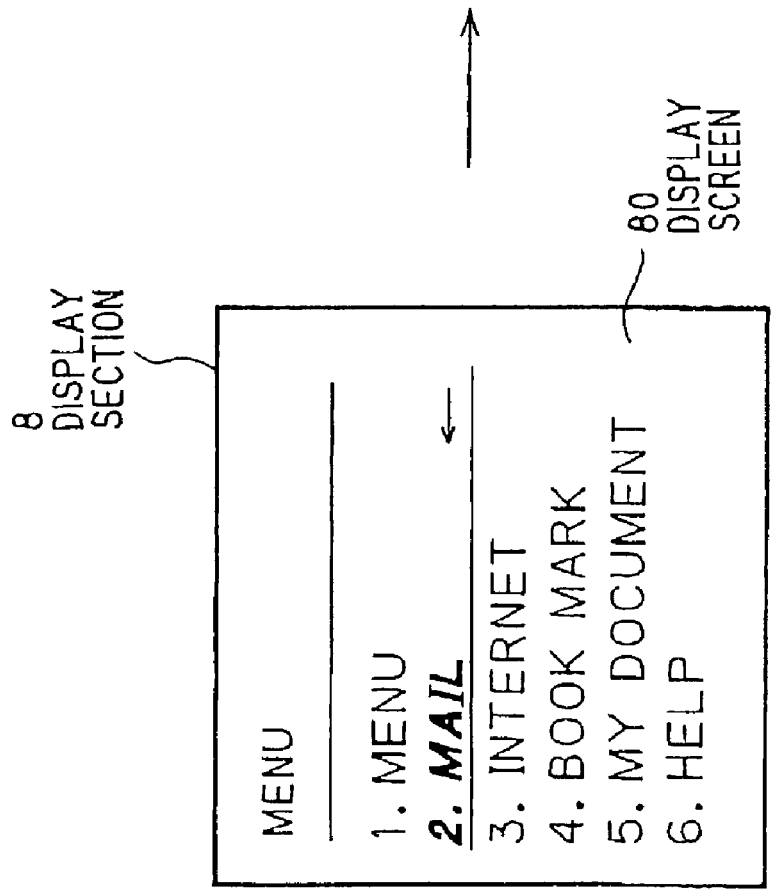

FIGS. 10A and 10B illustrate one example of display contents on the display section 8. In the case where selection items (e.g., "MENU", "MAIL" . . . and "HELP") are listed up on a display screen 80 of the display section 8, as illustrated in FIGS. 10A and 10B, a selected item can be changed by operating the mouse type input section 5 as illustrated in FIG. 10A and FIG. 10B.

Figure 11:
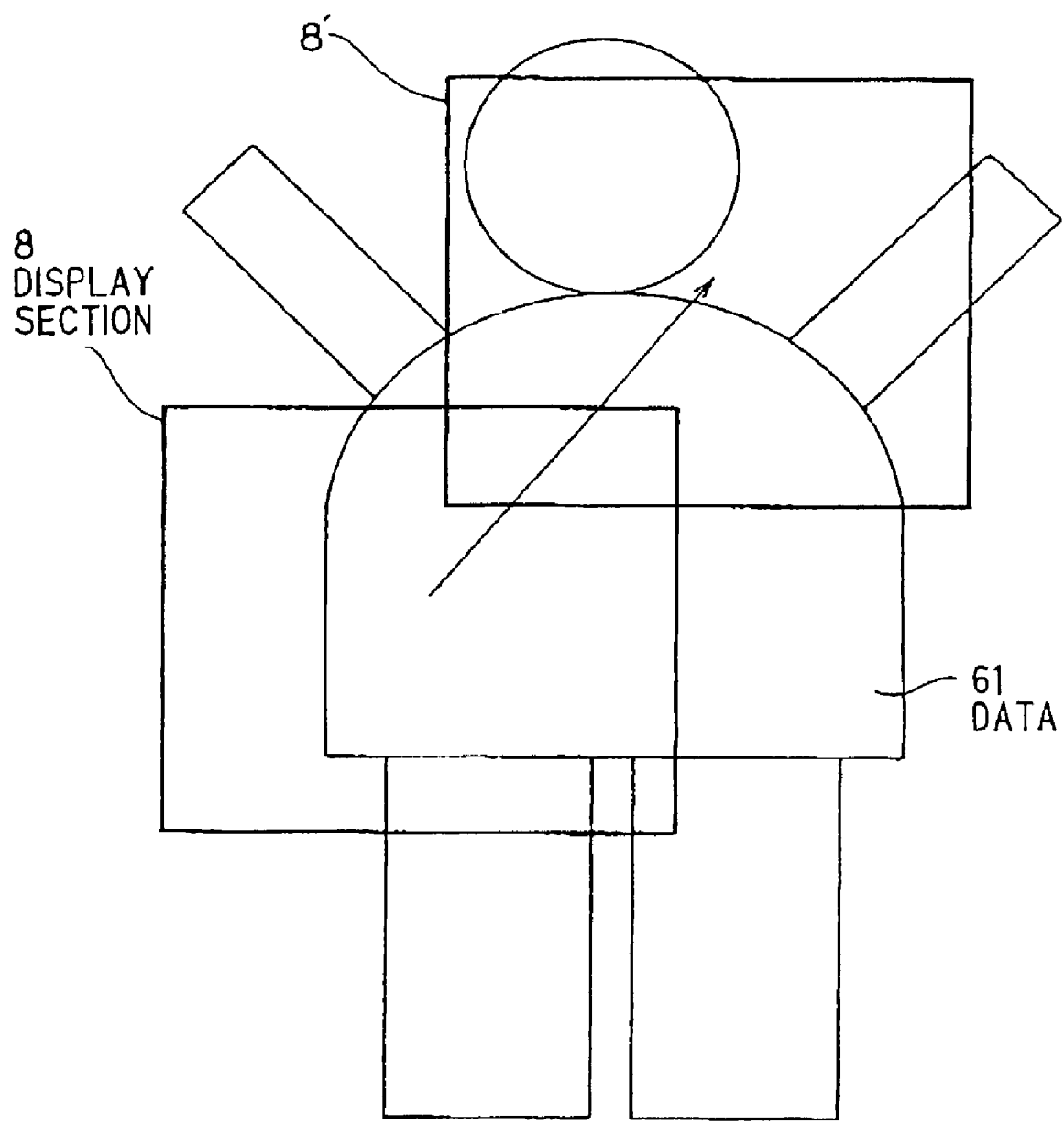
FIG. 11 is a diagram illustrating operation according to the present invention in the case where there is data which extends off a screen display frame in the display section.

FIG. 11 illustrates operation in the case where there is data which extends off a screen display frame in the display section 8. In the case where there is data 61 which cannot be displayed within the screen display frame in the display section 8, if the portable telephone set is moved in a direction indicated by an arrow in FIG. 11 with respect to the screen display frame and the mouse type input section 5 is operated, the data within the screen display frame is moved (i.e., scrolled), so that the entire data 61 can be seen.

Figure 12:
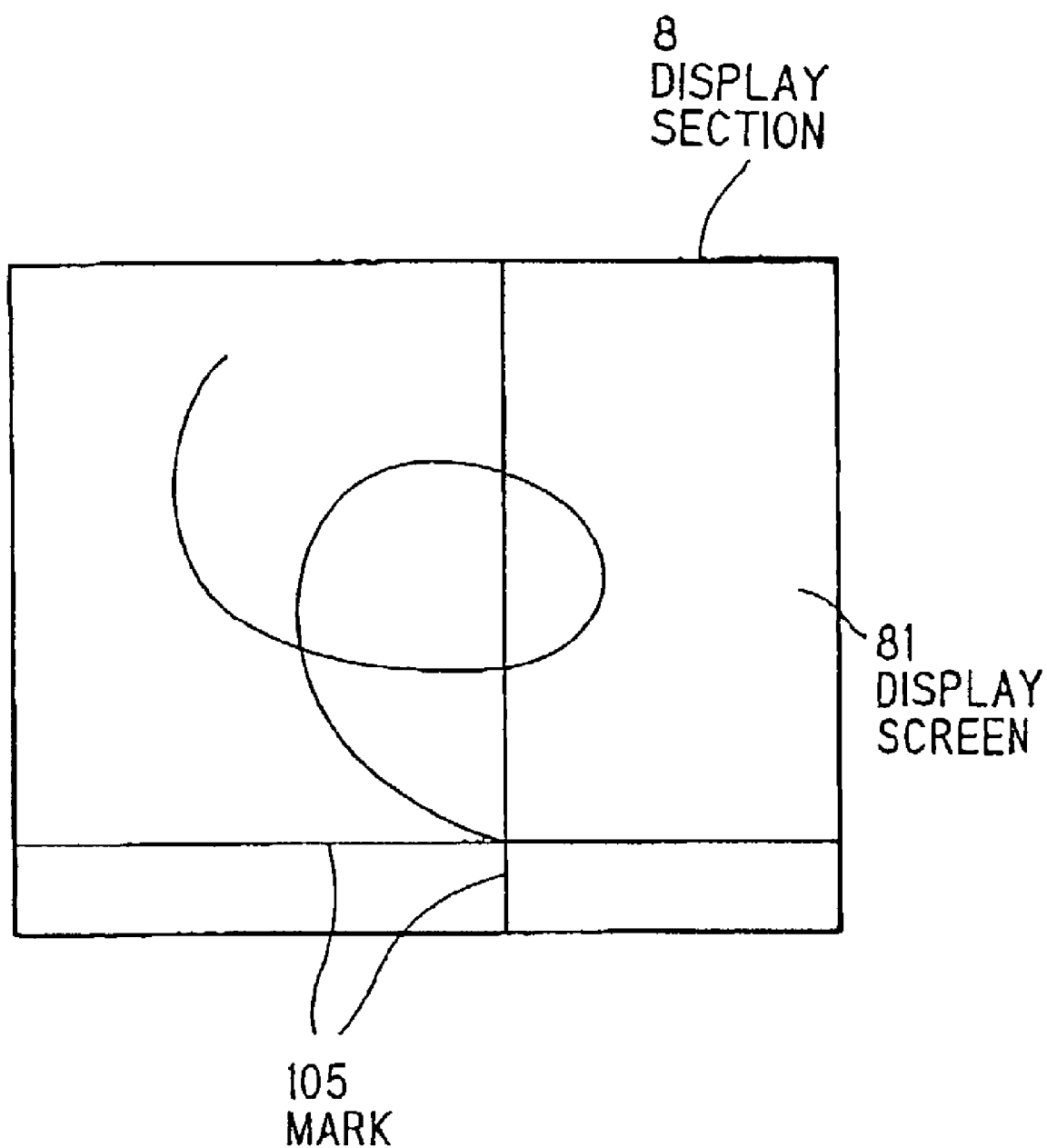
FIG. 12 is a diagram illustrating a screen in which a cursor is moved in an arbitrary direction by the operation of the mouse type input section according to the present invention.

FIG. 12 illustrates that the cursor is moved in an arbitrary direction by operation of the mouse type input section 5. As illustrated in FIG. 12, a cross mark 105 indicating a cursor position on a screen is displayed on a display screen 81. Since the cursor is moved on the screen 81 in arbitrary directions inclusive of slantwise directions in accordance with the mouse operation of the mouse type input section 5, a character or a picture (an illustration) can be readily written or drawn together with the input operation of the selection/execution key 33 or the buttons 51 or 71. For example, if a picture is drawn in the prior art, the display screen has been divided into dots, and then, the mark has been put at each dot. However, according to the present invention, a picture can be drawn by sequentially recording the trail of coordinates, thereby shortening a picture drawing time and eliminating cumbersomeness.

Subsequently, a description will be given below of the operation of the portable telephone set in the first preferred embodiment according to the present invention in reference to FIGS. 1 to 12.

When the input detector 11 outputs an input signal from the mouse type input section 5 to the coordinate detector 12, it outputs a moving quantity in each of the x and y directions and a moving speed. Based on the moving quantity, the coordinate detector 12 detects coordinate information. This coordinate information is sent to the display controller 13 at real time in accordance with the operation state of the mouse type input section 5. The display controller 13 scrolls the display screen or moves the cursor or the mouse pointer on the display screen at real time in accordance with the coordinate information from the coordinate detector 12. Since the coordinate, information can be obtained by the coordinate detector 12, a manually written character or a manually drawn picture can be input or drawn, for example. A signal from the mouse type input section 5 is detected as coordinate data by the coordinate detector 12, to be thus output to the display section 8 through the display controller 13.

In FIG. 10, the cursor is currently located at an underlined item indicated by an arrow. For example, when the mouse type input section 5 is moved downward (that is, the main body 101 and the operation casing 103 are moved), the input detector 11 outputs movement information in the y direction from the mouse type input section 5. The coordinate detector 12 detects the moving quantity in the y direction, and then, sends the moving quantity to the display controller 13. The display controller 13 controls to move the cursor on the display screen 80 in the display section 8 in accordance with the moving quantity in the y direction detected by the coordinate detector 12.

Otherwise, in the case where there is data which extends off the screen display frame, as illustrated in FIG. 11, an image displayed within the screen display frame can be moved by operating the mouse type input section 5. Consequently, it is possible to see the entire data.

As illustrated in FIG. 12, the mark 105 indicating the cursor position on the screen is displayed on the display screen 81, and its trail is changed in accordance with the mouse operation of the mouse type input section 5. In view of this, a character or a picture can be readily written or drawn by the mouse operation by the mouse type input section 5. The mark 105 may consist of arrows, characters or the like. The signal output from the mouse type input section 5 in accordance with the mouse operation by the mouse type input section 5 is detected as the coordinate data by the coordinate detector 12. The coordinate data is then stored in a memory (not illustrated in FIGS. 1 and 2). The coordinate data from the coordinate detector 12 are sequentially stored in the memory, and further, the data are synthesized, to be thus recognized as picture data or character data. Here, a character data file may be compared with the character data in the coordinate data obtained by the input detector 11 and the coordinate detector 12 in setting a character inputting mode, followed by a manually inputting operation.

Figure 13:
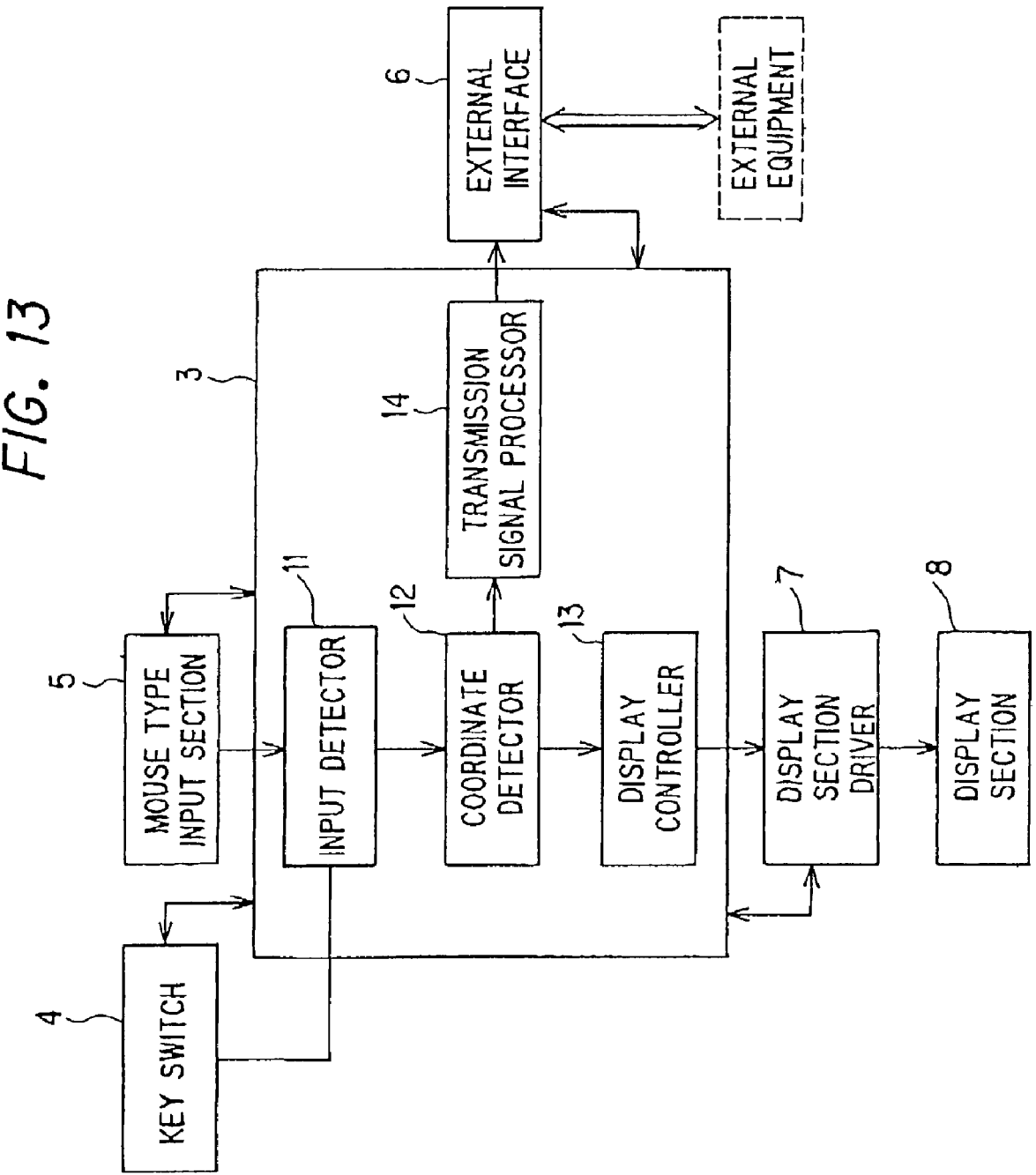
FIG. 13 is a block diagram illustrating a portable telephone set in a second embodiment according to the present invention.

FIG. 13 illustrates a portable telephone set in a second embodiment according to the present invention.

In FIG. 13, the same constituents as those illustrated in FIG. 2 are designated by the same reference numerals, and therefore, their duplicate explanation will be omitted hereunder. In addition to the arrangement illustrated in FIG. 2, the present embodiment is configured such that a transmission signal processor 14 is additionally interposed between a coordinate detector 12 and an external interface 6. The transmission signal processor 14 is equipped with the function of converting coordinate information output from the coordinate detector 12 into a predetermined transmission signal, so as to transmit the transmission signal to external equipment such as a personal computer via the external interface 6.

Subsequently, a description will be given below of the operation of the portable telephone set in the second embodiment.

Like in the first embodiment, an input detector 11 outputs an input signal received from a mouse type input section 5 to the coordinate detector 12. The coordinate detector 12 detects the coordinate information based on a moving quantity in each of x and y directions and a moving speed received from the input detector 11, and then, sends the coordinate information to a display controller 13. The display controller 13 performs controls of scrolling a display screen or moving a cursor or a mouse pointer On the display screen at real time in accordance with the coordinate information.

Furthermore, the coordinate detector 12 sends the coordinate data to the transmission signal processor 14. The transmission signal processor 14 converts the coordinate data into a predetermined transmission signal, and then, sends the transmission signal to the external equipment (e.g., the personal computer) via the external interface 6. Incidentally, a radio communication device independent of a radio circuit 2 may be disposed as the external interface 6, so that the transmission signal processor 14 may send the transmission signal via the radio communication device.

Figure 14:
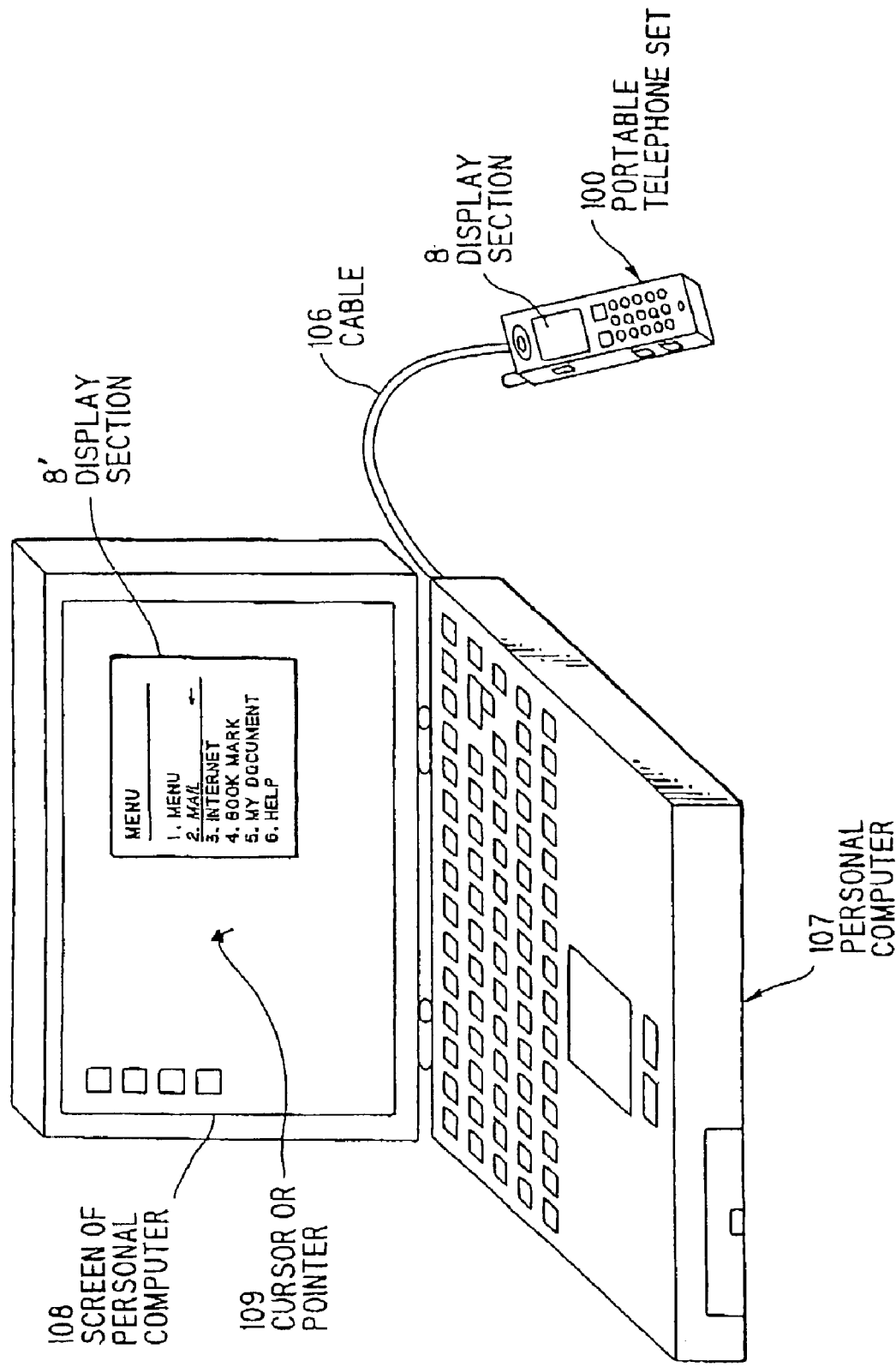
FIG. 14 is a perspective view showing the portable telephone set connected to a personal computer in the second embodiment according to the present invention.

FIG. 14 illustrates an example in which a portable telephone set 100 in the above-described second preferred embodiment is connected to a personal computer 107 serving as external equipment. The portable telephone set 100 is connected to the personal computer 107 via a cable 106. A suitable cable is used as the cable 106 in conformity with the specifications of the external interface 110, for example, a universal serial bus (abbreviated as "USB"). The external interface 110 may be suited for not only the cable but also a radio communication device independent of a radio circuit 2.

With the configuration illustrated in FIG. 14, the coordinate data, which has been converted into the transmission signal by the transmission signal processor 14, can be transferred to the personal computer 107. In the personal computer 107, a screen can be displayed on the display 108 of the personal computer or a cursor or a pointer 109 can be moved based on the coordinate data.

Figure 15:
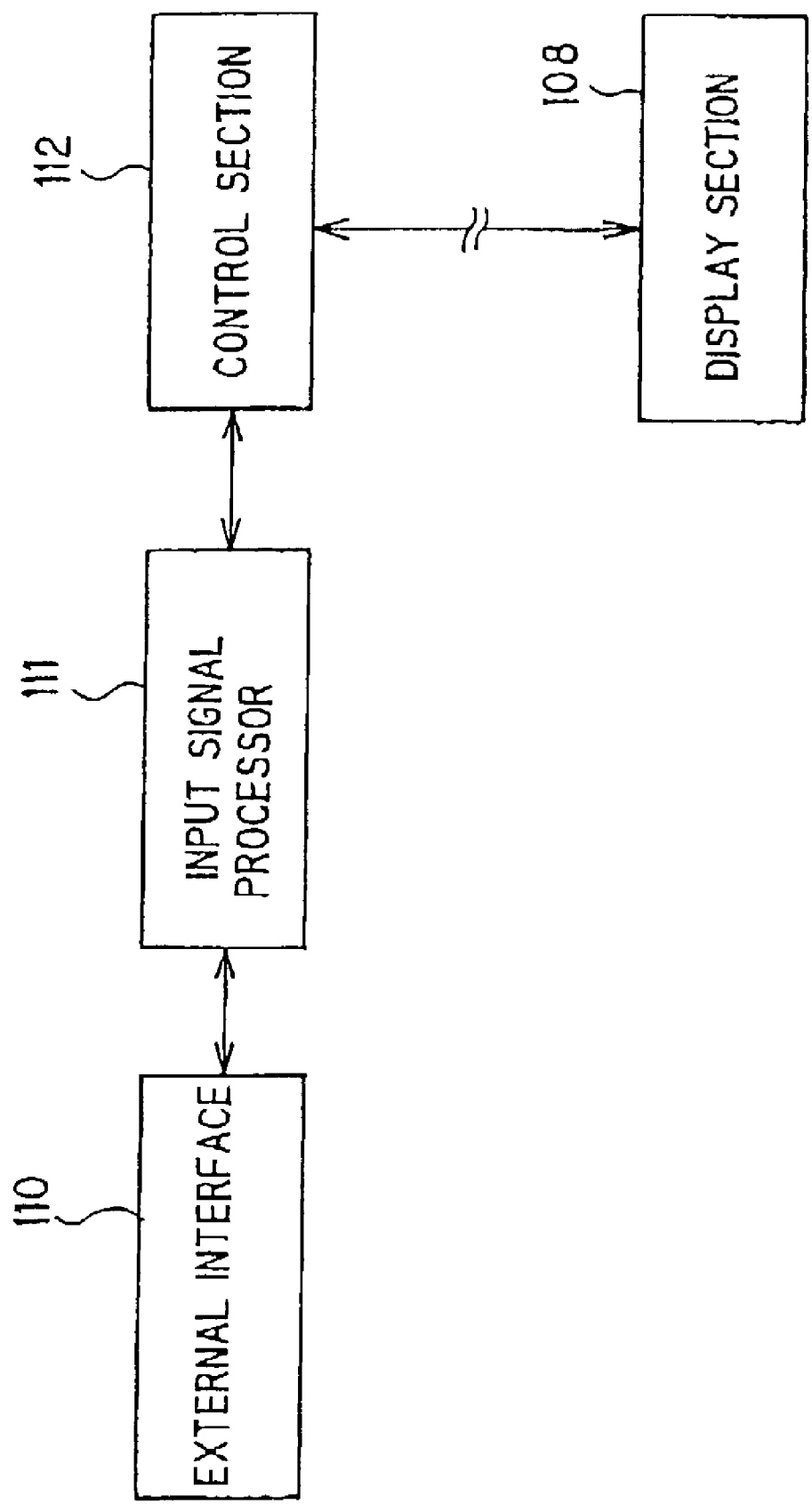
FIG. 15 is a block diagram illustrating the arrangement from an external interface to a display section in the personal computer illustrated in FIG. 14.

FIG. 15 illustrates the arrangement from the external interface to the display section in the personal computer illustrated in FIG. 14. The personal computer 107 includes the external interface 110 to be connected to the cable 106 To the external interface 110 is connected an input signal processor 111, to which is further connected a control section 112. Moreover, to the control section 112 is connected the display section 108. The control section 112 in the personal computer 107 performs a predetermined signal processing, and actuates to scroll the screen displayed on the display section 108 or move the cursor or the pointer 109.

The coordinate data sent from the potable telephone set 100 to the personal computer 107 is converted into a signal in a predetermined mode by the input signal processor 111, and then, the cursor or the pointer 109 on the screen displayed in the personal computer 107 can be operated. That is to say, the cursor or the pointer 109 can function as a general mouse in the personal computer. At this time, if the information on the screen in the potable telephone set 100 also is displayed on the screen of the display section 108 in the personal computer 107 via the external interface 110, the contents on the display screen in the potable telephone set 100 can he seen on the screen of the display section 108 having a large display size, thereby enhancing viewability and operability. In addition, software is constructed in such a manner that a character or a picture can be copied or pasted on the screen of the potable telephone set 100 by the use of an application for a personal computer displayed on the screen in the personal computer 107 on the software, thus producing the effect of the customization of the potable telephone set 100 to meet the user's need.

In recent years, a portable personal computer has remarkably become widespread. In the case of connection to the Internet on a private trip or on a business trip, many users connect the portable personal computer to a mobile phone or a PHS for communications. Poor operability of a mouse incorporated in the main body of the portable personal computer cannot be denied due to its small size in comparison with an externally connected mouse. Therefore, it is necessary to bring the externally connected mouse of better operability. However, the externally connected mouse is merely a burden in the case where the personal computer is not used, thereby inducing cumbersomeness in bringing it. What is worse, since the connection to the Internet is achieved by the connection between the personal computer 107 and the potable telephone set 100, the general mouse which is externally connected must be first connected, and then, the potable telephone set must be connected, thereby causing inconvenient connection with an attendant cumbersomeness in bringing the mouse. In contrast, in the potable telephone set according to the present invention, the operability equivalent to that of the general mouse can be achieved, and additionally, the potable telephone set looks merely a mobile phone in the case where the potable telephone set is not used as the mouse for the personal computer, thus eliminating cumbersomeness in bringing the potable telephone set.

It is to be understood that the present invention is not restricted to the particular embodiments given above, and that various modifications and alterations can be added thereto without departing from the scope of the invention.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A portable telephone set provided with a radio telephone function and including a main body provided with a display section, on which one or more selection items in addition to various displays are displayed, and key switches for an input operation, the portable telephone set comprising:

a mouse type input section, which is disposed in the main body and can select the selection items displayed on the display section; and a control section for detecting coordinates based on an output signal from the input section so as to control to move a display screen in the display section or specific information on one and the same plane in all directions on the basis of the detection result, the control section further comprising input detecting means for detecting movement data inclusive of a moving direction and a moving quantity in accordance with the operation of the input section and coordinate detecting means for acquiring coordinate data based on the movement data detected by the input detecting means.

2. A portable telephone set as claimed in claim 1, wherein the input section has the structural principle of a track ball type mouse or an optical mouse.

3. A portable telephone set as claimed in claim 1, wherein the input section is disposed at a back, side or bottom surface when the side on which the display section is disposed is regarded as the surface of the main body.

4. A portable telephone set as claimed in claim 1, wherein the control section further comprises:

display controlling means for scrolling the display screen in the display section and moving a mark on the display screen in addition to the movement of the input section based on the coordinate data acquired by the coordinate detecting means.

5. A portable telephone set as claimed in claim 4, wherein the control section includes:

transmission signal processing means for converting the coordinate data acquired by the coordinate detecting means into a predetermined transmission signal; and an external interface connected to external equipment, for sending the transmission signal processed by the transmission signal processing means to the external equipment.

6. A portable telephone set as claimed in claim 1, wherein the control section displays a mark on the display screen in the display section, and further, moves the mark in accordance with the operation of the input section.

7. A portable telephone set according to claim 1, wherein the control section scrolls the display screen in the display section and the selection items or a mark on the display screen in arbitrary directions inclusive of slantwise directions in accordance with the operation of the input section.

8. A portable telephone set according to claim 1, wherein the main body is a folio structure provided with a display section casing and an operation casing which are turnably joined via a hinge, and the input section is disposed in the operation casing.

9. A portable telephone set according to claim 1, wherein the control section allows contents of the display section to be displayed on another display means other than the display section.

10. A portable telephone set according to claim 9, wherein the control section scrolls the display screen in the display means in external equipment connected thereto via an external interface provided with the control section, or moves a mark on the display screen.

11. A portable telephone set according to claim 1, wherein the input section is disposed at an end surface in a longitudinal direction of the main body whose display surface and/or side surface has selection/execution buttons.

12. A portable telephone set according to claim 1, wherein a light source of the input section can be used also as other alert information alarms indicating a reception, charging and the like in the case of the optical type.

* * * * *